United States Patent [19]

Groobert

[11] Patent Number: 4,795,650
[45] Date of Patent: Jan. 3, 1989

[54] METHOD OF MAKING EXTRUDED FROZEN CHEESECAKE PRODUCT

[75] Inventor: Daniel Groobert, Boca Raton, Fla.

[73] Assignee: Food Trends, Inc., Fort Lauderdale, Fla.

[21] Appl. No.: 68,361

[22] Filed: Jul. 1, 1987

Related U.S. Application Data

[63] Continuation-in-part of Ser. No. 892,329, Aug. 4, 1986, abandoned.

[51] Int. Cl.$^4$ .................. A23C 19/00; A23G 9/00
[52] U.S. Cl. ..................... 426/306; 426/134; 426/565; 426/582; 426/516; 426/583
[58] Field of Search ............. 426/582, 68, 89–90, 426/91, 94, 95, 98–101, 103–104, 132, 134, 139, 289–295, 302–307, 310, 558, 564, 565, 570–573, 568, 583, 586, 580, 657, 658–660, 496, 512, 515, 520–524, 516

[56] References Cited

U.S. PATENT DOCUMENTS

| 3,669,687 | 6/1972 | D'Ercole | 99/139 |
| 4,163,806 | 8/1979 | Callen et al. | 426/582 |
| 4,297,379 | 10/1981 | Topalian et al. | 426/565 |
| 4,425,369 | 1/1984 | Sakamoto et al. | 426/582 |
| 4,500,553 | 2/1985 | Liggett et al. | 426/101 |

OTHER PUBLICATIONS

Beard, J. A. "Everybody Loves Cheesecake", Woman's Day-Encylopedia of Cookery; Fawcett Publ. Inc., NY (vol. 3) 1966, pp. 364–369.

*Primary Examiner*—Marianne Cintins
*Attorney, Agent, or Firm*—Oltman and Flynn

[57] ABSTRACT

A method of making an extruded frozen cheesecake product by combining ingredients to form a stabilized dispersion of cream cheese, sour cream, cream, egg yolks, sweetener, water and flavors which is then cooked, homogenized, aerated and frozen. The frozen mixture is extruded to form a free-standing structure and further frozen to a stable state.

20 Claims, No Drawings

METHOD OF MAKING EXTRUDED FROZEN CHEESECAKE PRODUCT

RELATED APPLICATION

This application is a continuation-in-part of my pending application Ser. No. 06/892,329 filed Aug. 4, 1986 now abandoned.

FIELD OF THE INVENTION

This invention relates to a method of making an extruded frozen cheesecake product that is edible only within the temperature range from substantially −10° F. to 30° F.

SUMMARY OF THE INVENTION

More particularly, the invention involves combining a stabilized dispersion with cream cheese, sour cream, cream, egg yolks, sweetener, water and flavors so as to produce a mixture which is then cooked, homogenized, aerated and frozen. The mixture with natural or artificial flavors is then passed through a specialty freezer so the mixture can be extruded (23° F.) frozen on to a plate to form a free standing structure so the structure may have a stick inserted and be further frozen to a stable state for further application of outside coatings and to make it physically coherent so it can be eaten, for example, as cheesecake on a stick. This physical coherency is referred to as mobile.

Additionally, the present invention teaches a process in which the finished product must be in a frozen form, either on a stick, so as to do for cheesecake what the cone did for ice cream, make it mobile, or in a nugget or stickless wedge form.

In accordance with the presently preferred embodiment of this invention, a critically important first step is to mix cream cheese and a gum stabilizer to form a slurry, which is then combined with a mixture of the other ingredients of the product. After forming, this mixture is pasteurized for a time interval much longer than is conventional, and then homogenized in order to obtain a thick viscous homogeneous batter. This batter preferably is precooled at a temperature substantially above 32° F. (45° F.) and then is frozen at a temperature sufficiently below 30° F. to freeze the water in the batter while injecting air into the product for texturing and obtaining a semi-frozen product with an appearance like shortening.

The next critical step is to extrude this semi-frozen product at a temperature within the range from substantially 21° F. to 25° F. The extruded product may be severed into pieces convenient for eating and frozen at a temperature suitable for long-term storage.

From the beginning of the pasteurization step until extrusion, the process takes place in a closed system to insure that the finished product has the desired flavor and other characteristics. All the mixing steps which precede pasteurization are carried out in covered mixers so that little or no ambient air can enter into the mixture to affect its flavor by oxidation.

The frozen cheesecake product obtained by the process of the present invention is edible only within a product temperature range from about −10° F. to 30° F. In this temperature range, the frozen cheesecake produced by this process is full flavored, smooth, creamy and capable of staying on a stick so that it can be eaten the same way as an ice cream bar or frozen novelty.

BACKGROUND OF THE INVENTION

Cheesecakes are classified as either souffle (bake) or rare (refrigerated) varieties. In either type, cheese is admixed with sugar, butter, cream, wheat flour (in case of souffle type) and the like. In conventional cheese cake mixing, the mixture of cheese if further admixed with, for example, beaten egg, so as to provide an increased volume. However, this operation for the mixture is troublesome, and in addition, still requires further preparation, for example, baking in a water bath. This requires great skill. In the rare type or variety, a cheesecake can be made by several different methods; for example, an emulsion of oil and water as demonstrated by Sakamoto U.S. Pat. No. 4,425,369, Jan. 10, 1984.

Additionally, other non-baked cheesecakes include blending cream cheese, lemon juice and condensed milk followed by refrigeration. U.S. Pat. No. 4,163,806 (1979) to Callen et al also teaches a method for making a refrigerated cheesecake that does not require baking.

While the aforementioned prior art compositions are generally characterized by a uniformly smooth and creamy texture, they do not retain these characteristics and are not considered to be edible in a frozen state.

Frozen ready-to-eat products, particularly those on a stick, are well known in the art. Ice cream has long been available, but new alternatives to ice cream are also available; for example, U.S. Pat. No. 3,669,687 to D'Ercole for preparing a novel frozen pudding and process. U.S. Pat. No. 4,297,379 to Topaliar et al discloses a frozen aerated gelatin composition which is storage stable, smooth and creamy without icy characteristics.

Additionally, U.S. Pat. No. 4,500,553 to Liggett et al (1985), teaches a method of producing a frozen dual-textured confection comprising a cream and a gelatin-containing aerated phase and a natural or simulated fruit phase to form a uniform emulsion. The partially frozen aerated emulsion is passed together with fruit through a filler head into a mold and frozen.

As a result of the present inventor's intensive study, it has been found that a frozen cheesecake can be easily made by using a certain formulation in conjunction with rigid cooking and processing requirements. Early attempts by the inventor herein were unsuccessful because the frozen cheesecake did not have a high flavor release or a good cheesecake texture at a −10° F. through 30° F., defeating the objective of a smooth and creamy, full-flavored, full-textured cheesecake while being frozen.

A principal object of this invention is to provide a novel method of making a frozen cheesecake product which can be eaten on a stick like an ice cream bar or the like, or in some other conveniently edible form, such as the shape of an individual piece of candy.

A further objective of this inventor is to provide a method of producing a cheesecake (real) only useful in its frozen state with a temperature range of −10° F. through 30° F.

A further object of this invention is to provide a method for producing a frozen cheesecake that will have a smooth and creamy texture and full flavor, the product being fully edible, rather than hard, flavorless and icy until thawed.

Further objects and advantages of this invention will be apparent from the following detailed description of a presently preferred embodiment.

DETAILED DESCRIPTION

It has now been found that the objectives of the invention as well as other objects and advantages of the present invention will become apparent to those skilled in the art from the following description.

According to the present invention, there is provided a cheesecake composition (i.e. made up of cream cheese, sugar, corn syrup, sour cream, heavy cream, egg yolk, water and flavoring and gum stabilizer) for use only in the frozen phase. The cheesecake composition comprises an emulsion in its liquid phase, a thick viscous homogeneous pasteurized batter in its cooked phase. This cooked phase must be further processed by aerating and partially freezing so the batter may be extruded (a process which allows an extremely viscous product to be formed—for example, pasta, cereal, etc.) and then frozen solid to a stable phase. Prior to final freezing, the product may or may not have a stick inserted. The cheesecake is only edible in its frozen (solid) stable phase. Alternatively, the frozen confection discharged from the extruder may be a stickless wedge or a miniature confection; for example, a nugget or candy size piece. Also the product may be covered in chocolate and a dry coating.

Alternatively, the frozen product on a stick can be covered in chocolate and dry coating to produce a frozen cheesecake on a stick. Since the composition of the present invention has only edible properties in the solid frozen phase, other confections may be made by admixing other appropriate ingredients, optimally nuts and flavoring, in its semi-frozen phase prior to extruding and thoroughly freezing.

A mixture is first prepared by heating the following in a batch mixer with agitation of the following ingredients and percentages by volume, i.e.: heavy cream 20.5%, sour cream 17.2%, sugar 4.5%, water 11.52%, cinnamon .21%, flavor 3%, corn syrup 9.9%, lemon juice 1.7%, egg yolks 4.1%. While mixed, the batch temperature must be at least 120° F. for 10 minutes for a uniform emulsion to ensue.

The cream cheese comprising at least 27.1% of the total mixture by volume along with the stabilizer of at least 0.27% of the total mixture by volume are combined at a temperature of 100° F. or above in a Cherry Burrel rapid mixer to insure no air is entrapped in the resulting slurry.

The liquid phase of the mixture is then completed by combining both above mentioned parts in whole and applying further agitation in the batch mixer at 120° F. for a minimum of 10 minutes.

This dispersion or emulsion is prepared according to methods known in the art such as combining the ingredients in a sufficiently agitated tank and subsequently passing the contents of the tank through a HTST (high temp short time) pasteurization plate exchange system.

The formed mixture of the 100% by volume and composition is now ready to begin the cooking phase.

The now emulsified mixture is cooked in a HTST (high temperature short time) pasteurizer for no less than 160 seconds at 180° F. to effectively activate the protein in the batter (mixture) to obtain the desired viscosity.

The next step is homogenizing the hot mixture at 155° F. to 160° F. in a single stage homogenizer at a pressure of 150± psi with a 1200 gallon per hour capacity flow to ensure a homogeneous pasteurized mixture before the mixture goes through the heat exchanger side of the HTST system resulting in a composition too viscous to homogenize. The desired viscosity range at this step is 179.2 CPS at 140° F. The mixture is now ready for cooling. The mixture is now cooled in the heat exchange side of the HTST to an outlet temperature of 45° F. The composition is now ready for precooling at 30° F. to 35° F. by using a thermutator (phase by Cherry Burrel) for scrape surface heat exchange for cooling and initial incorporation of air (0.5 cubic feet per hour) into the produced composition. After being cooled to just above freezing in the precooler, the composition is then pumped through a crystallization freezer (FDM manufactured by Cherry Burrel) where direct expansion cooling (i.e. ammonia) is used to take the product temperature well below freezing, 30° F., and to incorporate the final addition of air of 1.5 cubic feet per hour. This step texturizes the product (composition) and freezes the water in the product and gives it a shortening type appearance and characteristic.

The following viscosities and temperatures must be maintained to obtain the hereinabove mentioned results, i.e. 95° F. 371 CPS, 70° F. 513 CPS and 49° F. 870 CPS. The precooler and freezer temperature and viscosity are as follows: 1000 CPS and 23.5° F. The product now performs and resembles shortening and may now be extruded. The final draw temperature (after the crystallizer) is 21° F. through 23° F. with a total air injection rate of 2 cubic feet per hour to effect 30% overrun. The semifrozen structure is now ready for forming and the final frozen stage (phase). The extruded product is prepared according to methods known in the art of extrusion. The product may or may not now have a stick inserted prior to thoroughly freezing. Additionally, the product may be coated with a variety of products, for example, chocolate. The product may now be packaged. The frozen cheesecake product formulation containing two different stabilizers, each at two different concentrations were processed. The stabilizers used were gelatin and a cream cheese stabilizer, crest No. 645. The cream cheese stabilizer at 0.27% by total volume gave the desired product quality. It has been found that gelatin is a non-preferable alternative.

In a preferred embodiment of the present invention, the homo/pasteurized mixture most preferably contains 28%–30% butterfat by volume preferably from all natural dairy and food groups.

The following example is intended to illustrate certain embodiments of the present invention. The example is not meant to limit the invention beyond what is claimed below.

EXAMPLE

The following examples are by total % volume unless otherwise stated.

TABLE

A frozen cheesecake on a stick was prepared according to the following procedure to form a mixture:

| | |
|---|---|
| Cream cheese | 27.1% |
| Sour cream | 17.2% |
| Cream | 20.5% |
| Water | 11.52% |
| Stabilizer | .27% |
| Cinnamon | .21% |
| Flavor | 3.0% |
| Lemon Juice | 1.7% |
| Egg Yolk (sugared) | 4.1% |
| Sugar | 4.5% |
| Corn Syrup | 9.9% |

LIQUID PHASE

A critical first step in the present process is to mix cream cheese and a gum stabilizer separately from a mixture of the other ingredients of the product. Two separate, different starting mixtures are prepared.

In my process, gelatin is preferably not used as the stabilizer, because it causes difficulties in extruding the product and color loss in the frozen product.

Cottage cheese or Ricotta cheese cannot be substituted for cream cheese in my process because they cause an unreliable flavor and an objectionably grainy texture of the frozen product.

(1) Cream cheese and a gum stabilizer are mixed to form a slurry in a covered liquifier at a temperature within the range from 100° F. to 120° F., which I have discovered to be high enough to actuate the stabilizer and prevent the fat globules from retaining excessive air but not so high as to cause loss of flavor.

Preferably, the stabilizer contains guargum, carrageenan and locust bean gum. The liquifier may be a Cherry-Burrell EPC processor, sold by Cherry-Burrell Corporation, Cedar Rapids, Iowa.

(2) Secondly, a mixture of other ingredients such as cream, sour cream, water, egg yolk, sugar, corn syrup, lemon juice, and cinnamon is prepared in a covered batch tank at a temperature within the range from 110° F. to 120° F. At a temperature below 110° F. the viscosity of the mixture is so high that it is extremely difficult to pump and will not emulsify properly later in the process.

(3) The separate mixtures obtained from steps (1) and (2) above are combined with agitation in a covered batch mixer at a temperature of about 120° F. for 10 minutes. Preferably, in the combined mixture, cream cheese is present in an amount of at least 27% (by volume) of the total, and the gum stabilizer is at least 0.27%. Preferably, the other ingredients are, by volume: sour cream 17.2%, cream 20.5%, cinnamon 0.21%, flavor 3.0%, lemon juice 1.7%, sugared egg yolk 4.1%, sugar 4.5%, corn syrup 9.9% and the balance water.

The critical importance of preparing the two starting mixtures separately has been shown by my unsuccessful attempts to combine the cream cheese and the stabilizer directly with the other ingredients without first preparing a separate slurry of the cream cheese and the stabilizer. Since cream cheese comes in block form, a proper emulsion is not obtainable in a single mixture unless the mixture is agitated and heated enough to detract significantly from the flavor of the finished product.

COOKING PHASE (4) The mixture is cooked in a high temperature, short time pasteurizer of known design, at a temperature substantially within the range from 175° F. to 185° F. for a time period within the range from about 145 seconds to 165 seconds, preferably 160 seconds. This pasteurizing step in the present process is unusually long compared to the usual practice of pastuerizing just long enough to comply with the minimum requirements of the Food and Drug Administration. The reason for this departure from standard practice is to activate the protein in the egg and cheese ingredients and increase the viscosity of the mixture to the value I have found necessary for the finished product. The pasteurization time does not exceed 160 seconds in the present process to avoid having the viscosity of the mixture so great as to seriously impede later steps in the process.

(5) The formed mixture is then passed through a one stage homogenizer to prevent possible coalescing and ensure a uniform product at 1200 gallons per hour at a pressure of approximately 150PSI.

(6) The now viscous batter may now be brought or pumped through a precooler (thermutator) and final freezer, and overrun effected.

The pre-cooled composition then is pumped through a crystallization freezer in which direct expansion cooling reduces its temperature well below 30° F., freezing water in the composition and giving it to an appearance like shortening. This crystallization freezer may be a Cherry-Burrell FDM freezer operating at 20.5° F. through 23.5° F.

(7) The resulting composition must then be extruded to form a semi-frozen free standing structure.

The semi-frozen product may be cut to the desired size, such as that of an ice cream bar or an individual piece of candy by using a hot wire to sever individual segments from a continuous extruded web or ribbon of the product. As a practical matter, the semi-frozen product is too thick to be molded, and molding tends to remove air that was put in to give the product the desired texture.

(8) The frozen phase must now be performed by thoroughly freezing the product to effect a stable phase at −45° F. for 22 minutes. Just prior to this step a stick may or may not be added. Furthermore, admixing particulars may be done in the final cooling phase. The resulting product has a baked cheesecake texture and flavor, is visually unique as a wedge on a stick or in its stickless form as a true wedge of cheesecake or further, in the miniature nugget form. The finished products result in a mobile cheesecake on a stick or stickless forms which is edible only in the solid frozen phase.

The frozen product should be kept at a temperature within the range from −10° F. to 30° F. In this temperature range, the product is edible and physically coherent. Above 30° F. it becomes somewhat soupy and will not stay on a stick.

From the pasteurization step until the extrusion step, the processing equipment provides a closed system that prevents exposure of the product to ambient air, which could affect its flavor adversely and produce undesired oxidation.

I claim:

1. A method of making a frozen cheesecake product which is edible when its temperature ranges about from −10° F. to 30° F., the method comprising:
    (a) forming a first mixture of sour cream 17.2%, cream 20.5%, corn syrup 9.9%, sugar 4.5%, cinnamon 0.21%, flavor 3%, water 11.52%, lemon juice 1.7%, and egg yolk 4.1% all by volume of a later combined mixture;
    (b) forming a second mixture of cream cheese 27.1% and a stabilizer 0.27%, also by volume of the later combined mixture in a rapid mixer at about 110° F. to form a slurry;
    (c) combining both the first mixture and the second mixture slurry to form a combined mixture that is then pasturized and homogenized at a temperature with the range from about 165° F. to 185° F. for a time period within a range from about 145 second to 165 seconds to obtain a thick viscous batter;
    (d) pre-cooling the batter to establish a base for aeration;

(e) crystalization freezing and aerating of the precooled batter having a temperature range of about 21° F.–23.5° F. to freeze water therein and obtain a semi-frozen product with a shortening-like appearance to achieve viscosity for forming an extrudible composition; and (f) extruding the semi-frozen product having a temperature range from about 21° F. to 23° F. to form a self-supporting composition for thoroughly freezing to −45° F.

2. A method as in claim 1 wherein forming the second mixture is further comprised of liquifying the cream cheese, combining the cream cheese with a stabilizer and slurrying in a non-acid medium.

3. A method as in claim 1 wherein pasteurizing is accomplished by a high temperature short time process of cooking the batter at 180° F. for 160 seconds to effect an extremely viscous cheesecake batter.

4. A method as in claim 1 wherein homogenizing is accomplished in a single stage homogenizer at a pressure of about 150 psi.

5. A method as in claim 1 wherein fruit is added to the batter.

6. A method as in claim 1 wherein the cream is an artificial cream cheese.

7. A method as in claim 1 wherein the sour cream is an artificial sour cream.

8. A method as in claim 5 wherein the fruit is natural.

9. A method as in claim 1 which further comprises inserting a stick into the combined mixture prior to thoroughly freezing so the frozen cheesecake is mobile.

10. A method as in claim 9 which further comprises covering the frozen cheesecake with a chocolate covering after thoroughly freezing.

11. A method as in claim 10 wherein a dry coating is applied to the chocolate.

12. A method according to claim 1 wherein said pasteurizing, precooling and freezing steps are carried out in a closed system to prevent exposure of the product to ambient air.

13. A method according to claim 1 wherein said mixing steps preceding said pasteurizing step are carried out in covered mixers.

14. A method of making a frozen cheesecake product which is edible when its temperature ranges about from −10° F. to 30° F., the method comprising:

(a) forming a first mixture of sour cream, corn syrup, sugar, cinnamon, flavoring, water lemon juice, and egg yolk;

(b) forming a second mixture of cream cheese and a stabilizer;

(c) combining both the first mixture and second mixture to form a combined mixture.

(d) pasteurizing the combined mixture to obtain a viscous batter;

(e) homogenizing the batter to obtain a substantially uniform product;

(f) precooling the batter to establish a base for aeration;

(g) aerating the batter;

(h) crystalization freezing and further aerating of the precooled batter having a temperature range of about 21° F.–23.5° F. to freeze water therein and obtain a semi-frozen product with a shortening-like appearance to achieve viscosity for forming an extrudable composition; and (i) extruding the semi-frozen product having a temperature range from about 21° F.–23° F. to form a self-supporting composition for thoroughly freezing to −45° F.

15. A method as in claim 14 wherein forming the second mixture is further comprised of liquifying the cream cheese, combining the cream cheese with a stabilizer and slurrying in a non-acid medium.

16. A method as in claim 14 wherein pasteurizing is accomplished by a high temperature short time process of cooking the batter at a temperature range from about 165° F. to 185° F. for a time period in the range of about 145 seconds to 165 seconds to effect a viscous cheesecake batter.

17. A method as in claim 14 wherein homogenizing is accomplished in a single stage homogenizer at a pressure of about 150 psi.

18. A method as in claim 14 wherein fruit is added to the batter.

19. A method as in claim 14 which further comprises inserting a stick into the combined mixture prior to thoroughly freezing so the frozen cheesecake is mobile.

20. A method as in claim 14 which further comprises covering the frozen cheesecake with chocolate coating after thoroughly freezing.

* * * * *